United States Patent
Carley et al.

(10) Patent No.: US 11,111,163 B2
(45) Date of Patent: Sep. 7, 2021

(54) TIME-RELEASE TABLET AND METHODS

(71) Applicant: Spectrum Brands, Inc., Middleton, WI (US)

(72) Inventors: Joseph C. Carley, Blacksburg, VA (US); Derek James Meyers, Forest Hill, MD (US); Daniel Anderson Newman, Salem, VA (US); Mary W. Orr, Pearisburg, VA (US); Timothy Plafcan, Blacksburg, VA (US); Christian Schobert, Chrisiansburg, VA (US)

(73) Assignee: Spectrum Brands, Inc., Middleton, WI (US)

( * ) Notice: Subject to any disclaimer, the term of this patent is extended or adjusted under 35 U.S.C. 154(b) by 352 days.

(21) Appl. No.: 15/563,433

(22) PCT Filed: Apr. 1, 2016

(86) PCT No.: PCT/US2016/025643
§ 371 (c)(1),
(2) Date: Sep. 29, 2017

(87) PCT Pub. No.: WO2016/161331
PCT Pub. Date: Oct. 6, 2016

(65) Prior Publication Data
US 2018/0065872 A1  Mar. 8, 2018

Related U.S. Application Data

(60) Provisional application No. 62/141,663, filed on Apr. 1, 2015.

(51) Int. Cl.
*A01N 25/10* (2006.01)
*A01N 25/34* (2006.01)
(Continued)

(52) U.S. Cl.
CPC .............. *C02F 1/688* (2013.01); *A01N 25/10* (2013.01); *A01N 25/34* (2013.01); *A01N 33/08* (2013.01);
(Continued)

(58) Field of Classification Search
CPC ........ A01N 25/10; A01N 25/34; A01N 33/08; A01N 33/12; A01N 2300/00; C02F 1/283;
(Continued)

(56) References Cited

U.S. PATENT DOCUMENTS

| 4,122,192 A | 10/1978 | Fellows |
| 5,071,587 A | 12/1991 | Perman |

(Continued)

FOREIGN PATENT DOCUMENTS

| EP | 2084109 A2 | 8/2009 |
| FR | 2880623 | 7/2006 |
| WO | 2013/046215 | 4/2013 |

OTHER PUBLICATIONS

Extended European Search Report, European Application No. 16774342.6, dated Jan. 9, 2019.

(Continued)

*Primary Examiner* — Lucas A Stelling
(74) *Attorney, Agent, or Firm* — Merchant & Gould P.C.

(57) ABSTRACT

A time-release composition and method of making and using the time-release composition. The time-release composition may include an active ingredient that is useful in deterring unwanted growth, such as bacterial and fungal growth, in high-flow water environments. The composition can include several active ingredients to provide a multiple use tablet. The multi-use tablet can be used to dispense any combination of active ingredients that act as clarifiers, minerals, medications, buffers, chemical dosing, and/or other mainte- (Continued)

nance components, such as growth deterrents and water filtration augmentation and any combination thereof.

4 Claims, 13 Drawing Sheets

(51) Int. Cl.
*A01N 33/08* (2006.01)
*A01N 33/12* (2006.01)
*C02F 1/28* (2006.01)
*C02F 1/50* (2006.01)
*C02F 1/66* (2006.01)
*C02F 1/68* (2006.01)

(52) U.S. Cl.
CPC .............. *A01N 33/12* (2013.01); *C02F 1/283* (2013.01); *C02F 1/50* (2013.01); *A01N 2300/00* (2013.01); *C02F 1/66* (2013.01); *C02F 1/687* (2013.01); *C02F 2201/006* (2013.01); *C02F 2303/04* (2013.01); *C02F 2303/20* (2013.01); *C02F 2305/14* (2013.01)

(58) Field of Classification Search
CPC .... C02F 1/50; C02F 1/66; C02F 1/687; C02F 1/688; C02F 2201/006; C02F 2303/04; C02F 2303/20; C02F 2305/14; B01F 1/0027; B01F 1/0033; A47K 5/04; A47K 5/06; A47K 5/08; A47L 15/4445; A47L 15/449

See application file for complete search history.

(56) References Cited

U.S. PATENT DOCUMENTS

| | | | |
|---|---|---|---|
| 5,593,648 A * | 1/1997 | Christie | .............. A47L 15/4445 134/93 |
| 5,888,386 A * | 3/1999 | Enright | .................... C02F 1/688 210/167.11 |
| 6,048,501 A * | 4/2000 | Lemaire | .............. A47L 15/4445 134/93 |
| 6,099,728 A | 8/2000 | Bairischer | |
| 6,180,056 B1 | 1/2001 | McNeel et al. | |
| 6,290,848 B1 | 9/2001 | Tanner et al. | |
| 7,060,181 B2 | 6/2006 | Fox et al. | |
| 8,303,811 B1 | 11/2012 | Mihlbauer | |
| 2004/0099562 A1* | 5/2004 | Vazquez | ................. E03D 9/033 206/461 |
| 2005/0036982 A1 | 2/2005 | Unhoch et al. | |

OTHER PUBLICATIONS

Communication Pursuant to Rule 164(1) EPC, European Application No. 16774342.6, dated Sep. 24, 2018.
International Search Report for PCT/US2016/025643, dated Jul. 19, 2016.

* cited by examiner

Table 1: EBC-1 concentration over time in 5-gallon tanks 3 different filter systems.

Table 2: EBC-1 concentration over time in 10-gallon tanks with six different filter systems.

Table 3: EBC-1 concentration over time in 20-gallon tanks with five different filter systems.

Table 4: EBC-1 concentration over time in 30-gallon tanks with four different filter systems.

Table 5: EBC-1 concentration over time in 40-gallon tanks with three different filter systems.

TIME-RELEASE TABLET AND METHODS

This application is a U.S. National Stage application of PCT/US2016/025643, filed on 1 Apr. 2016, which claims benefit of U.S. Provisional Patent Application No. 62/141,663, filed Apr. 1, 2015, and which applications are hereby incorporated by reference in their entireties. To the extent appropriate, a claim of priority is made to each of the above disclosed applications.

TECHNICAL FIELD

The disclosure relates generally to a time-release tablet and tablet holder. The tablet is made with a formulation for time-release of an active ingredient. In some aspects, this disclosure relates to long-term time-release of an active ingredient in a high-flow aquatic environment to prophylactically reduce fouling.

BACKGROUND

Chemical formulations used to treat water using active ingredients to treat low flow or stagnant water are well-known. For example EP 2084109 is drawn to a solid product for water potabilization. In particular, EP 2084109 is directed to a compacted solid product for water purification comprising: at least a first layer comprising at least a coagulant/flocculant system comprising at least one polyvalent inorganic salt, at least one water-soluble cationic polymer, and at least one high-molecular-weight anionic polymer; at least a second layer comprising at least one disinfectant that releases active chlorine on contact with water, characterized in that said coagulant/flocculant system comprises a sodium alginate. The '109 patent further describes the use of the solid product in wells and ponds.

U.S. Pat. No. 4,122,192 to Fellows teaches a composition for making up a disinfectant or sterilizing preparation, which comprises a disinfecting or sterilizing amount of saturated dialdehyde having from 2 to 6 carbon atoms absorbed and/or adsorbed on an inorganic or organic particulate cartridge material and, in some cases, an alkalinating agent. The '192 patent further describes the use of the liquids, gels and sprays for the killing of bacteria and fungi. However, the composition is directed to an immediate biocidal effect and does not provide long-term prevention of bacterial and fungal regrowth.

In another extended tablet formulation by Willis et al., dual layer compositions are shown to provide a quick and extended release formulation. For instance, one layer comprises a composition that includes plaster and an active agent, and it may further include at least one of a water-soluble binder, a non-water-soluble binder, and a lubricant. The second layer may comprise a composition that includes a plaster and an active agent, and it may further include at least one of a disintegrating agent, a non-water-soluble binder, and a lubricant. The compositions may be heated and mixed and formed into a tablet. However, the chemical formulations described in Willis et al. are directed to stagnant water applications, such as artificial water-holding containers or tanks, flooded crypts, transformer vaults, abandoned swimming pools, construction and other natural or man-made depressions, stream eddies, creek edges, and detention ponds.

Another example of controlling contamination of an aqueous environment is described in U.S. Pat. No. 6,180,056 to McNeel et al. which provides a composition for controlling fouling in an aqueous system using a separation membrane comprising introducing an effective amount of a formulation upstream of the separation membrane, wherein the formulation comprises at least one anionic antiscalant and at least one cationically-charged biocide, wherein the biocide has no hydrophobic moieties. However, the formulation described in the '056 patent is used to provide an anti-fouling in a no-flow or a low-flow settings. For example, the '056 patent is used in the aqueous systems used for producing high-purity or potable water in which the absence of biocide in the permeate water is a necessity. Aqueous systems include those systems used in the making of paper and paper containing products, metalworking fluids, power, electronics, chemical, petroleum, mining, biological and industrial waste waters, cooling tower water, and drinking water systems. In such systems, the composition of the present disclosure is preferably added following multimedia filtration and prior to cartridge filtration, which is ahead of the membrane separation system. Furthermore, the chemical formulation is placed in a body of water and freely allowed to move throughout the body of water, causing dispersion throughout the entire water sample. Moreover, the chemical formulation is processed in a manner to allow permeation through filtration membranes.

Aquarium water chemistry can be a source of poor results for people simply wanting to enjoy their aquarium. Unwanted growth and pH crashes can both negatively impact success in the hobby. Thus, there is a need for a chemical formulation that provides time-release delivery of active ingredients in high-flow environments. The product seeks to simplify the maintenance of pH, improve filter performance (flocculants) and reduce water filtration and purity problems. The active ingredient is delivered over an extended period of time with the concentration being delivered in a manner where the active concentration rises over the first few days, then tapers slowly down as the release rate slows and the active ingredients are taken up. The chemical formulation, in the form of a tablet or block, can be disposed within a tablet holder to treat the water container. Additionally, the chemical formulation should be processed to allow for placement in a filter cartridge or dispersion container.

SUMMARY

This disclosure is directed to achieve the aforementioned unmet needs, namely, a time-release tablet that can provide prophylactic treatment of high-flow water containers, wherein the tablet provides a long-term use. Specifically, this disclosure is directed to a time-release tablet that can provide prophylactic treatment of an aqueous environment for at least 30 days.

DEFINITIONS

Figure 1:
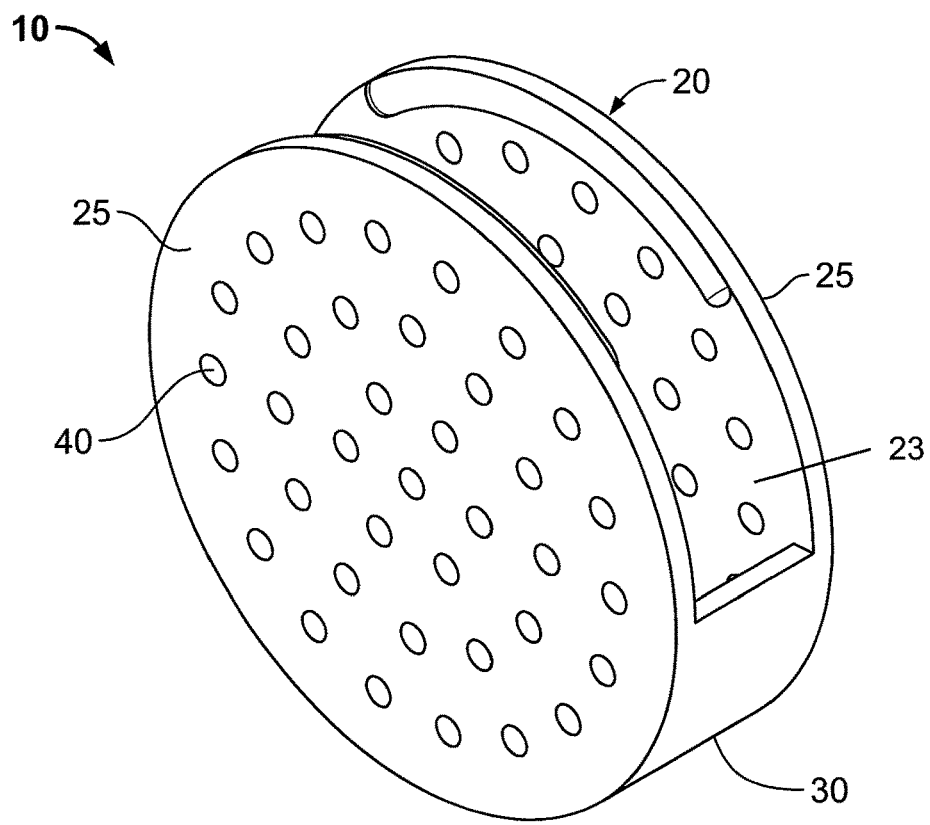
FIG. 1 is a perspective view of one embodiment of a tablet holder.

As used herein, the term "tablet" refers to a mixture of dry ingredients that form a single structure through compression.

As described herein, the term "block" refers to a mixture of wet ingredients that can be poured into a mold, dried and removed in a solid or semi-solid state.

As described herein, the term "high-flow" refers to non-stagnate water with a flow generally greater than 50 gallons per hour.

DETAILED DESCRIPTION

A time-release composition is described herein. Moreover, the method of making and using the time-release composition is also described. In example aspects, the time-release composition includes a composition that is useful in deterring unwanted growth, such as bacterial and fungal growth, in high-flow water environments. In other example aspects, the time-release composition includes flocculants or clarifier, in high-flow water environments. The composition can include several active ingredients to provide a multiple use tablet. The multi-use tablet can be used to dispense any combination of active ingredients that act as clarifiers, minerals, medications, buffers, chemical dosing, and/or other maintenance components, such as growth deterrents and water filtration augmentation and any combination thereof.

A time-release material included with a filter cartridge will release enough "active ingredients" (like buffers, flocculants, minerals and growth inhibitors) to maintain a healthy and clean aquarium. Replacing the filter cartridge every 30 days replenishes the source of active ingredients, in addition to replacing the carbon and mechanical filtration media that has traditionally been on a monthly replacement cycle.

Sustained-Release Tablets

In one formulation, the active ingredient(s), binder, pH buffer and other optional components are combined in proper concentrations and poured into castings to form blocks or pressed into tablets to create a measured dose. The measured dose, typically a single tablet 5 (best shown in FIG. 2) or block, is sized to occupy the interior of the tablet holder 10.

Tablet 5 comprises a chemical formulation that includes ionene polymers as an active ingredient. These polymers are non-foaming in water and extremely low in toxicity to most aquatic animals. Such polymers have been shown to be microbicidal at certain levels and under certain conditions, as described in further detail below. Ionene polymers have a variety of other uses in aqueous systems such as bactericides and algicides as well as removing and prophylactically controlling biofilm and slime formation.

Ionene polymers as described herein are cationic polymers in which a substantial proportion of the atoms providing the positive charge are quaternized nitrogens located in the main polymeric chain or backbone rather than in pendant groups. In one example embodiment, the formulation comprises poly[oxyethylene(dimethyliminio) ethylene(dimethyliminio) ethylene dichloride] as the active ingredient. In other related embodiments the active ingredients are algicides, such as, diuron, copper, monolinuron, zinc oxide and combinations thereof. Active ingredients can also include clarifiers, such as, alum, polyacrylamide, ferrous, silica, bentonite, alginates, potassium permanganate and combinations thereof. The active ingredients are typically 0.1% to 2% by weight of the chemical formulation.

The time-release formulation further comprises a pH buffer. The pH buffer is selected from a group consisting of calcium hydroxide and/or sodium bicarbonate. Other pH buffers can include sodium carbonate, limestone, citric acid, carbonic acid and combinations thereof. The pH buffer is used in an amount of between 2 and 20% by weight of the final composition. In at least one example embodiment, the pH buffer is used in an amount of about 15%. In addition to buffering, the pH buffer also enhances the density of the time-release formulation for use in high flow water systems.

The time-release formulation also comprises a binder material that is selected from a group consisting of polyethylene glycol, gypsum plaster, cellulose, sodium chloride, calcium sulfate, polyethylene glycol, potash and combinations thereof. The binder is used in an amount of between 0.4% to 1.0% by weight of the final composition. In one example embodiment, the binder is 0.8% by weight of the final composition. When forming tablet 5, as described in more detail below, the amount of binder is determined by the proportion needed for effective tablet formation and tablet strength. Other optional ingredients can be included to enhance the performance and properties of the time-release formulation.

Tablet Holder

Figure 2:
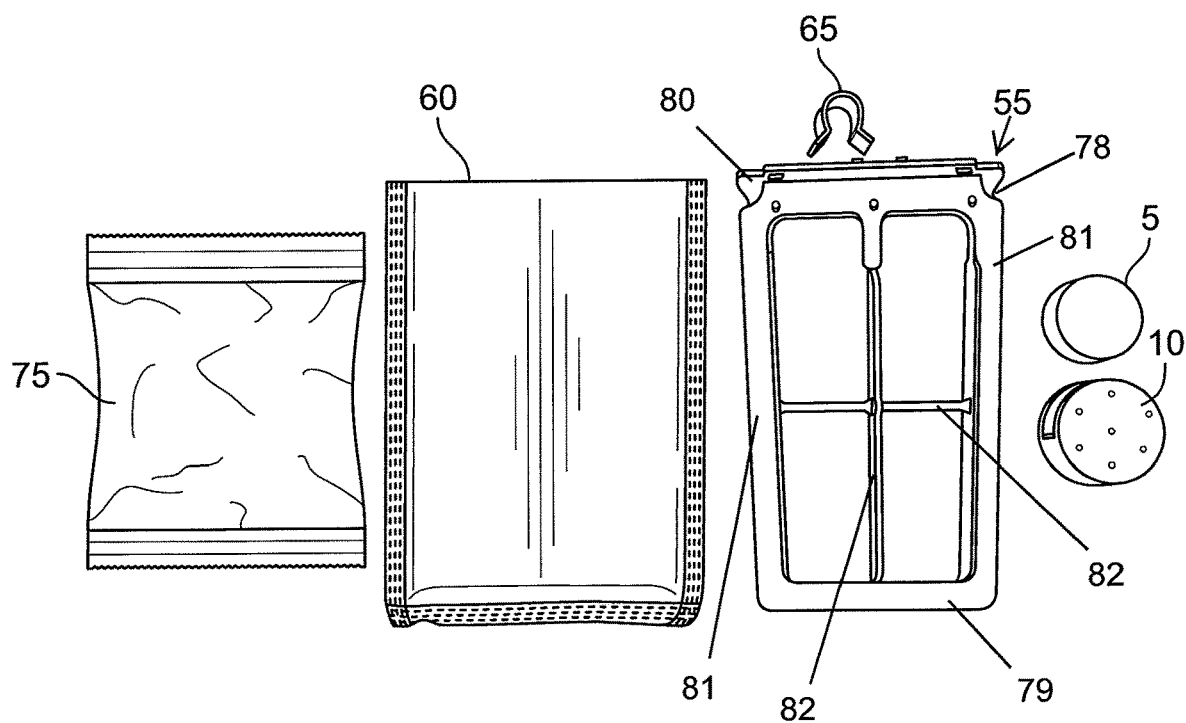
FIG. 2 is an exploded perspective view of an embodiment of a water filtration kit utilizing the tablet holder of FIG. 1 as well as a frame, semi-porous barrier, and pouch.

Referring now to FIG. 1 where the tablet holder 10 generally comprises a body portion 20 having two opposing sides 25 and forming an internal cavity 23 for placing a tablet therein. As shown, sides 25 comprise apertures 40 in communication with the internal cavity 23 for the control of fluid interaction with tablet (not shown) when placed in the cavity 23 during use. As shown sides are connected via edge 30. As shown in FIGS. 1 and 2, a portion of edge 30 is removed to allow for tablet 5 to be placed therein. It should be appreciated that a mechanical lid or cap (not shown) can be used to prevent tablet 5 from exiting the internal cavity 23 of tablet holder 10 when in use. In addition, tablet holder 10 is designed to control flow across face of tablet 5 and prevent abrasion of tablet surface when positioned in tablet holder 10, creating a mechanism for time-release of active ingredients. In the FIG. 1 embodiment, the tablet holder 10 includes the two sides 25, circular in shape, connected by the edge 30 along a section between 90 degrees and 270 degrees, for example, about 180 degrees. The section not connected by the edge 30 is open, in communication with and permitting access to the internal cavity 23.

The sides 25 and apertures 40 protect the tablet from dispersing too quickly or being cracked or damaged by particulates that may be flowing through the water container. Furthermore, the number and size of apertures 40 contribute to the rate of active ingredient dispensed over time. For example, in some arrangements, the number and size of apertures 40 help to ensure that the tablet 5 will dissolve in a uniform manner, discussed further below.

An alternate embodiment of tablet holder 10 is shown in FIGS. 8-11. In this embodiment, the two sides 25 are connected by edge 30, which extends continuously 360 degrees. The edge 30 is integral with side 25a. Side 25b is attached to side 25a with connecting tab 27, and side 25b removably attaches to side 25a with, for example, a snap connection. Side 25b can be snapped off of the edge 30 to provide access to the cavity 23 to permit placement of the tablet 5. In the embodiment of FIGS. 8, 9, 10 and 11, each side 25a, 25b comprises 6 apertures. In a related embodiment, side 25b is hingeably attached to side 25a or edge 30. In at least this example embodiment side 25b is connected to side 25a or edge 30.

In the embodiment of FIG. 1, tablet holder 10, comprises, for each side 25, at least one aperture 40, at least 6 apertures 40, at least 20 apertures 40, no greater than 50 apertures 40, in some embodiments 30-40 apertures 40, and in the illustrated examples, thirty-seven apertures 40 per side (FIG. 1), 7 apertures 40 per side (FIGS. 2, 3, and 6) and 6 apertures 40 per side (FIGS. 8-11).

In some example embodiments, each aperture 40 is sized between 0.25 mm to 1.75 mm. In some example embodiments, each aperture 40 is sized between 0.5 mm to 1.25 mm. In other related embodiments, apertures 40 are sized to about 1.25 mm. In other related embodiments, apertures 40 are sized to about 0.5 mm. One of ordinary skill in the art could readily appreciate the number and size of the apertures necessary to achieve the proper rate of water flow through tablet holder 10. Additionally, the apertures 40 provide uniform flow rate on the tablet 5 to provide a constant quality and quantity of treated water, although the concentration of the active ingredient within the tank, may be higher early in the treatment process.

Figure 11:
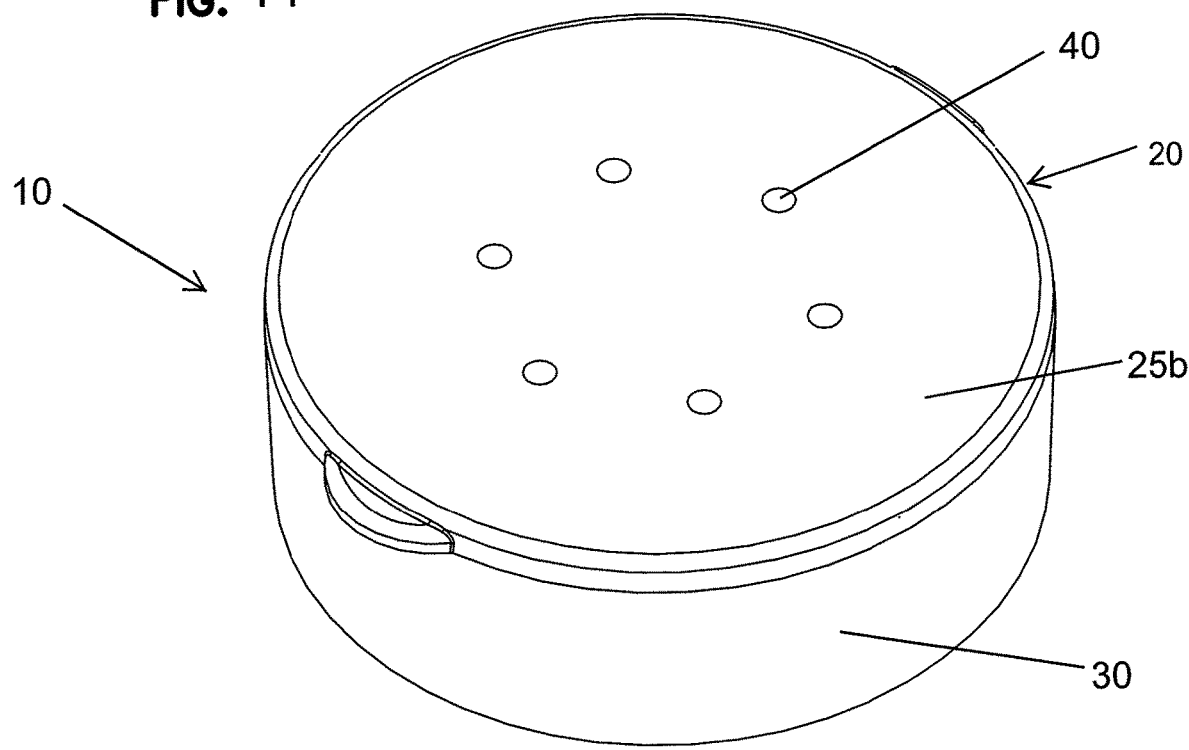
FIG. 11 is a perspective view of the tablet holder used as part of the kit of FIG. 2.
Figure 12:
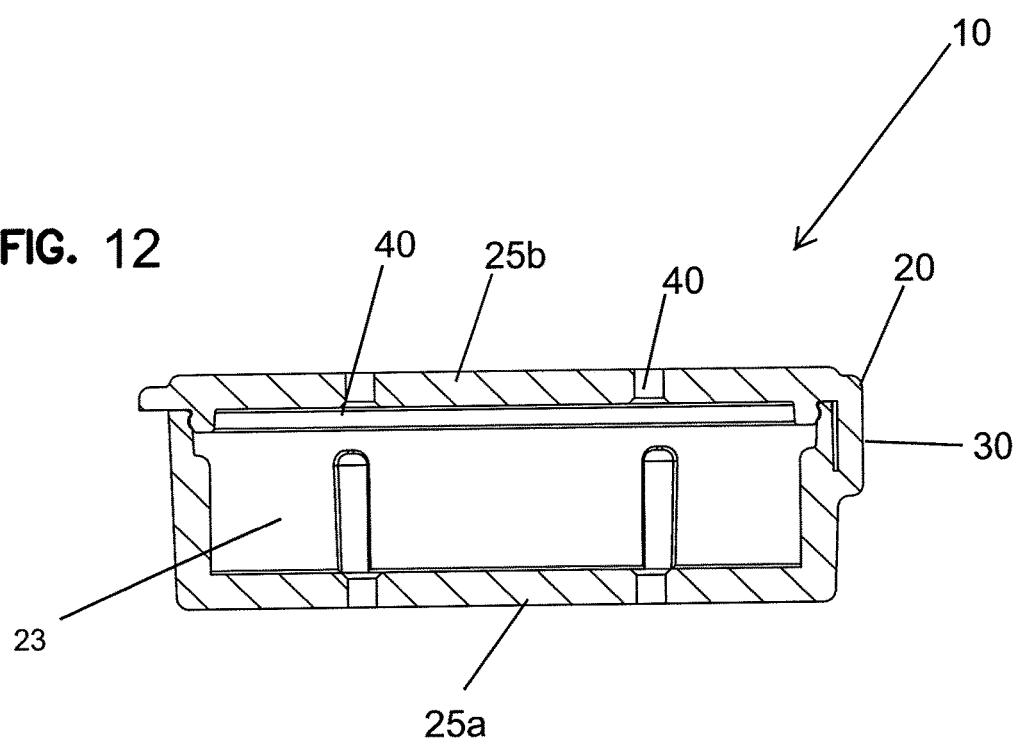
FIG. 12 is a cross-sectional view of the tablet holder of FIG. 11.

As shown in FIGS. 1 and 11-12, tablet holder 10 is fabricated in a cylindrical shape. However, it should be appreciated that a variety of shapes and designs could be utilized, so long as the tablet 5 can be placed within the internal cavity 23 of tablet holder 10. One such alternative embodiment is a spherical shape.

Figure 6:
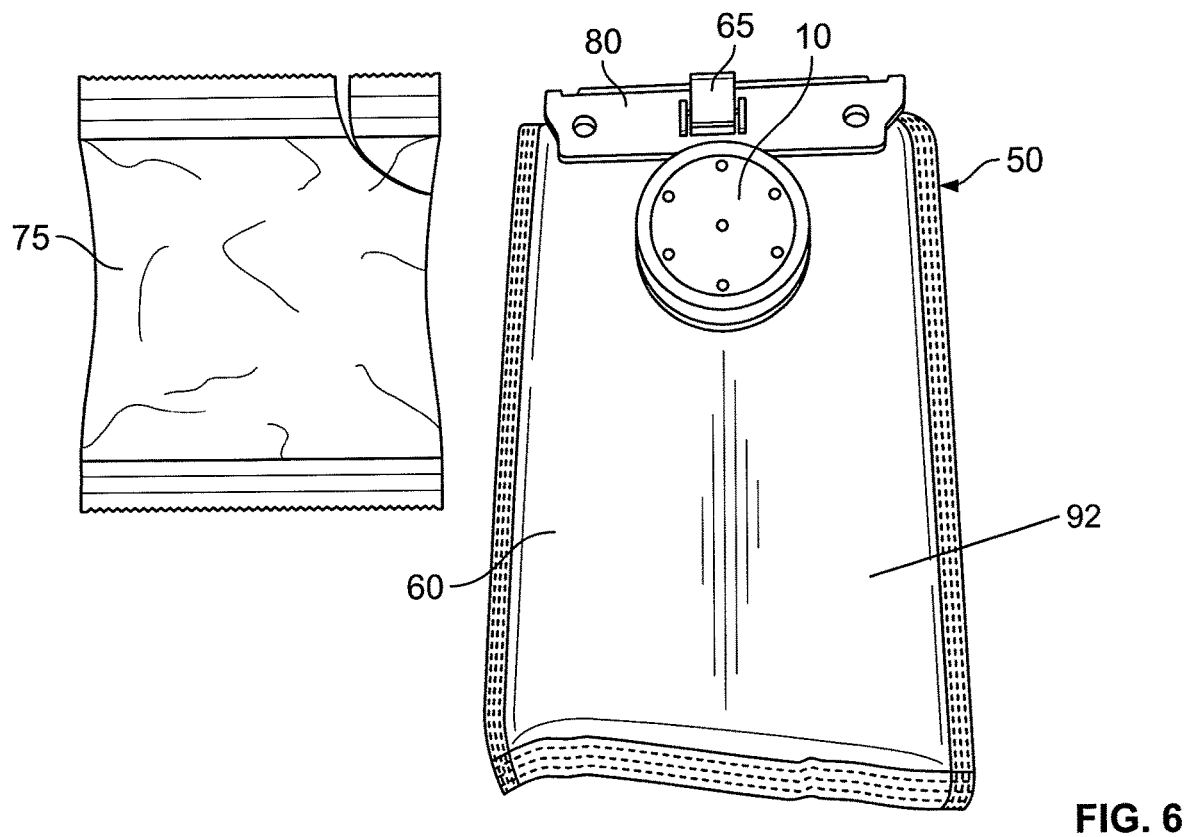
FIG. 6 is a perspective view of an assembled kit of FIG. 2, depicting the pouch and the filter cartridge with tablet holder attached thereto.

In example embodiments, tablet holder 10 includes a mechanism to attach tablet holder 10 to a substrate. This attachment mechanism allows for tablet holder 10 to remain in a fixed position near the filtration assembly. This positioning of the tablet holder 10 contributes to advantages by dispensing active ingredients from tablet 5 in a predetermined dosing regimen. For example, the attachment mechanism can be embodied as an integrated clip (not shown) along one of the sides 25 for attaching tablet holder 10 to the exterior of a filter cartridge 50, as depicted in FIG. 6. Many embodiments of attachment mechanism are possible. As discussed below in connection with the embodiment of FIGS. 9 and 10, the tablet holder 10 may also be attached to a frame 55 of filter cartridge 50.

The tablet holder 10 may be made of materials known to one of ordinary skill in the art. In particular, non-corrosive, rust-resistant materials are contemplated. One such material is plastic. In alternative embodiments, the tablet holder 10 may include a porous basket, fabric mesh or non-woven fiber pouch for time-release media. In at least these example embodiments, the tablet holder 10 is manufactured for a chemical mixture that is in a non-tablet form. However it should be appreciated that additional compounds may need to be added to allow the time-release mechanism of the chemical formulation release over an at least 30 day period, such that the treatment time before additional chemical mixture added is at least 30 days. Further, in at least this example embodiment, the structural design of tablet holder 10, such as aperture size and/or number, will need to be fabricated in a manner to allow a non-tablet or non-block formulation to function properly.

Filter Cartridge

Figure 3:
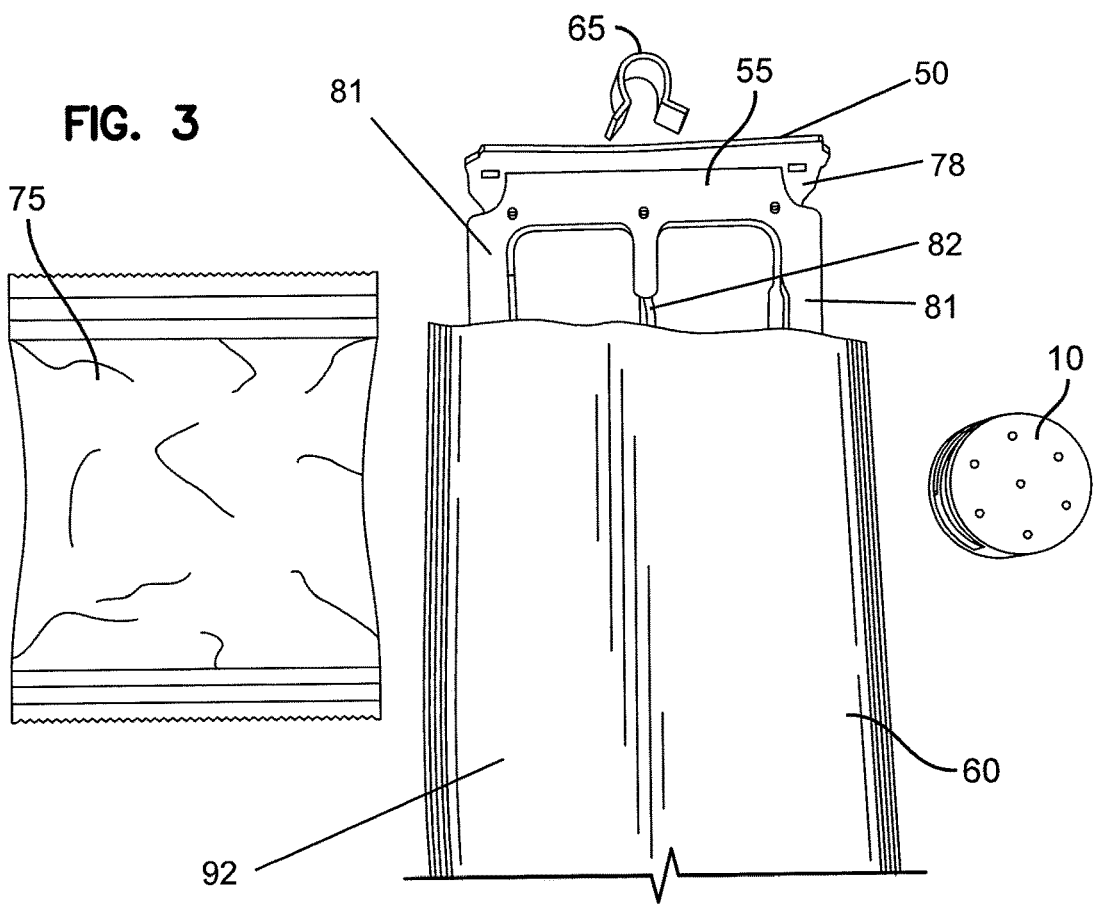
FIG. 3 is an exploded perspective view of the water filtration kit of FIG. 2 and depicting the frame of the kit disposed within the semi-porous barrier of the kit.
Figure 4:
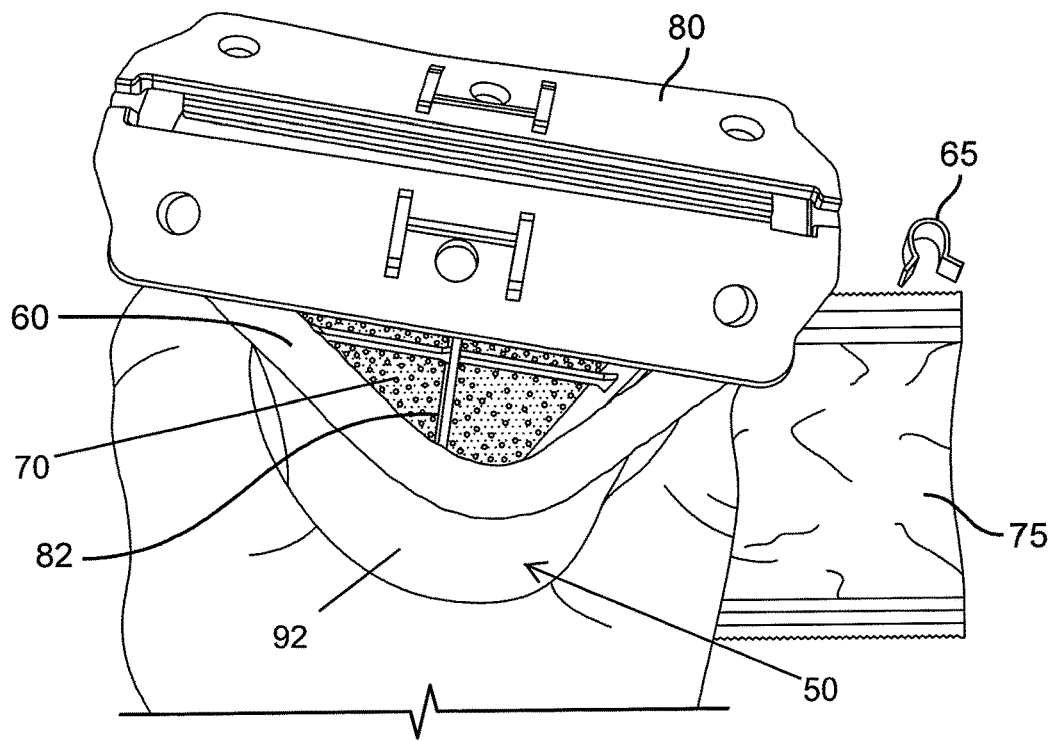
FIG. 4 is a perspective view of the frame disposed within the semi-porous barrier and illustrating a flap assembly of frame.
Figure 5:
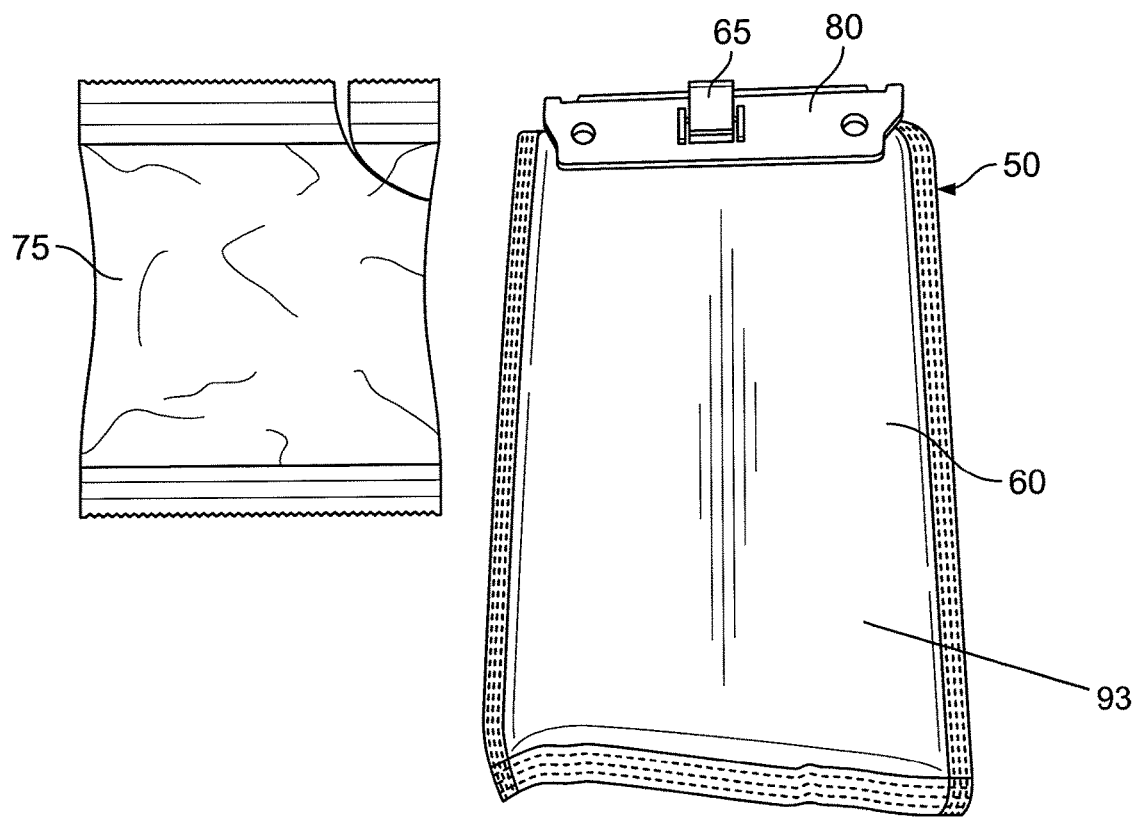
FIG. 5 is a perspective view of the pouch, frame, and semi-porous barrier shown as part of the kit of FIG. 2, and depicting the flap assembly of FIG. 4 sealing the opening of the semi-porous barrier.

Referring to FIGS. 2-9, best shown in FIG. 6, filter cartridge 50 generally includes the frame 55 and a semi-porous barrier 60. Charcoal or other filtration material 70 can be placed into the semi-porous barrier 60. Referring now to FIG. 5 where filter cartridge 50 is shown having a frame 55 and a semi-porous barrier 60, also shown in FIGS. 2-4.

Figure 8:
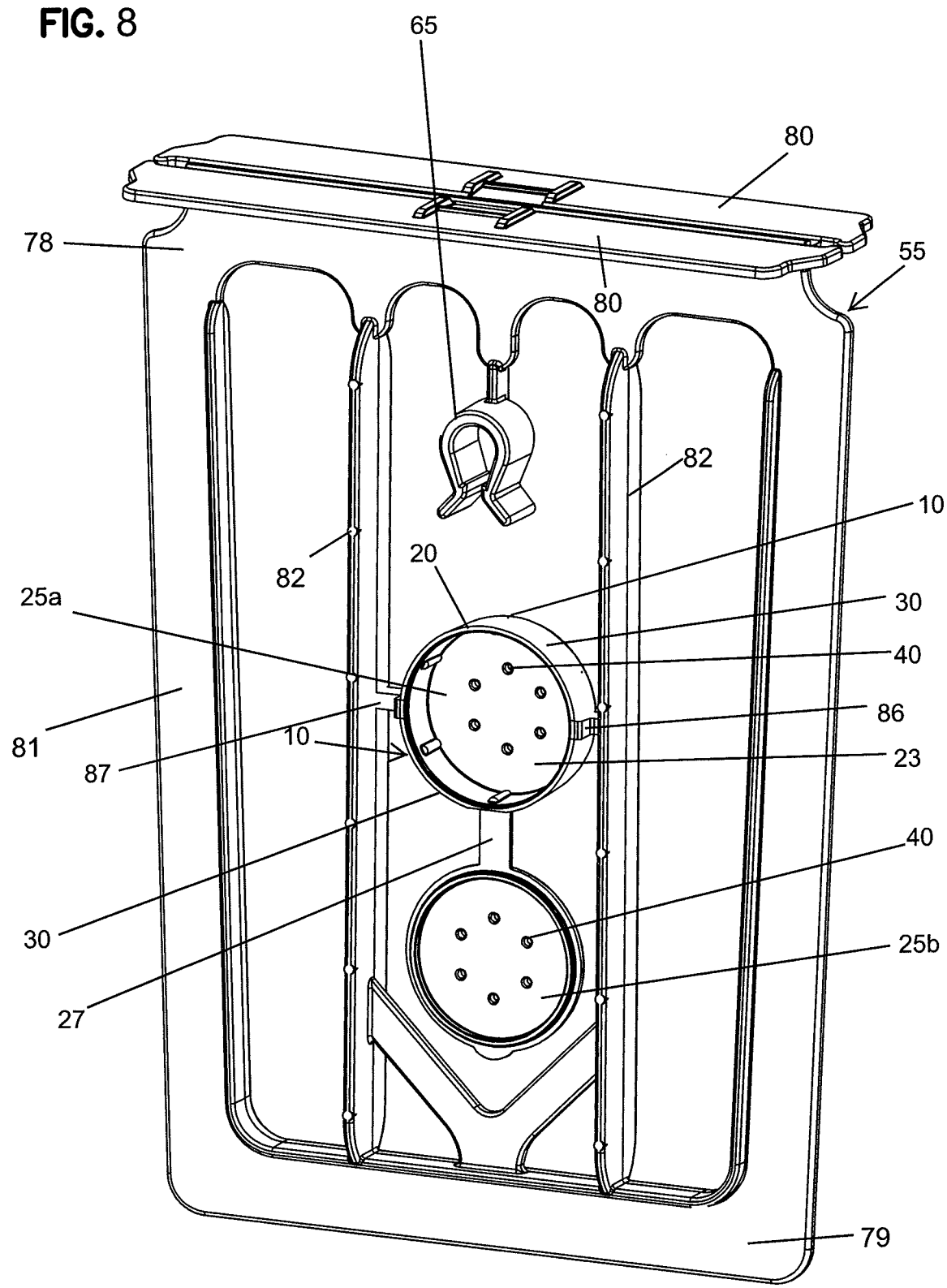
FIG. 8 is a perspective view of a first side of the assembled frame, clip, and tablet holder shown as part of the kit of FIG. 2.
Figure 9:
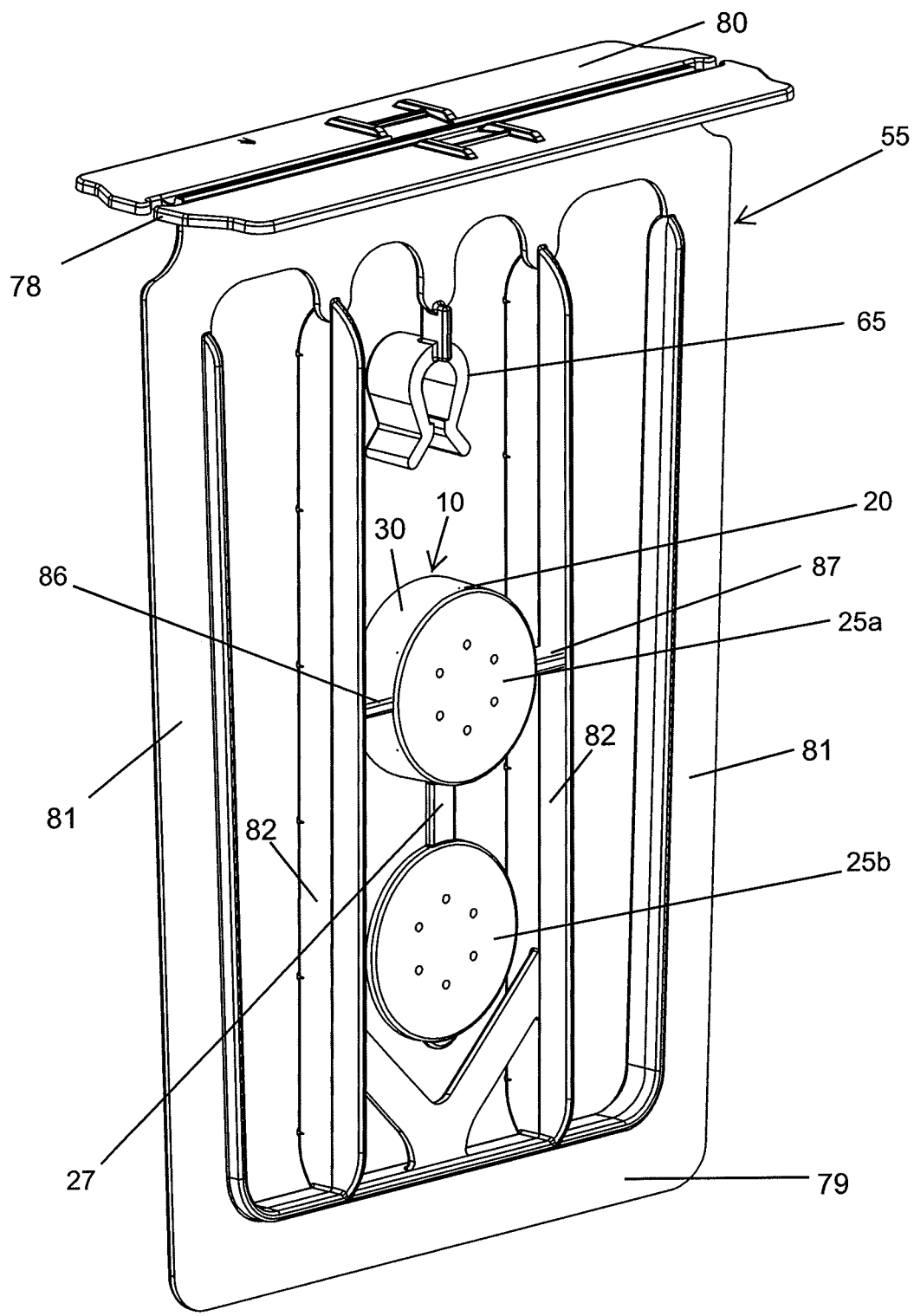
FIG. 9 is a perspective view of an opposite side of the assembled frame, clip, and tablet holder of FIG. 8.

Frame 55 provides the filter cartridge 50 assembly a rigid structure in the filter housing. As shown, frame 55 further comprises a frame clip 65 used as a mechanism to fasten the top portion of frame 55 on the opening of the semi-porous barrier 60. As shown in FIGS. 8-9, frame clip 65 can be removably attached to frame 55. This feature may be utilized to facilitate packaging of filter cartridge.

The frame 55 can be molded plastic. It includes a perimeter defining a frame formed by top portion 78, bottom portion 79 and side portions 81. In one embodiment, two flaps 80 are hingeably attached to the top edge of top portion 78. Alternatively, the flaps 80 can be integrally molded with the frame and provided with plastic living hinges, that is, portions of plastic which are flexible and resist fatigue failure. The flaps 80 may be attached in any manner known by one of ordinary skill in the art.

The interior of the periphery of frame 55 includes a plurality of separators 82. As shown in FIG. 2, separators 82 extend vertically and horizontally between the outer perimeter of frame 55. Alternatively, as shown in FIGS. 8-9, separators 82 extend vertically between top portion 78 and bottom portion 79. In FIGS. 2-3 and 8-9, the separators 82 are shown as vertical flanges which have a narrow thickness in the direction perpendicular to the plane formed by the perimeter of the filter frame. This minimizes the surface area which is transverse to the flow of the water being filtered when the frame cartridge 50 is in use.

The separators 82 have a width which is one-half to three-quarters of an inch for a semi-porous barrier 60 which is about four inches by six inches. The width of a separator is measured in a direction perpendicular to the plane of the perimeter defining frame; that is, parallel to the direction of flow when the frame cartridge 50 is in use. The separators 82 are designed to be thin enough as to not impede the flow of water through the semi-porous barrier 60. They also, preferably, extend laterally forward and behind the frame surface to adequately space apart the walls of the semi-porous barrier 60. The separators 82 contribute to strengthening the frame 55 relative to the force of water pressure running through the filter cartridge 50.

Figure 10:
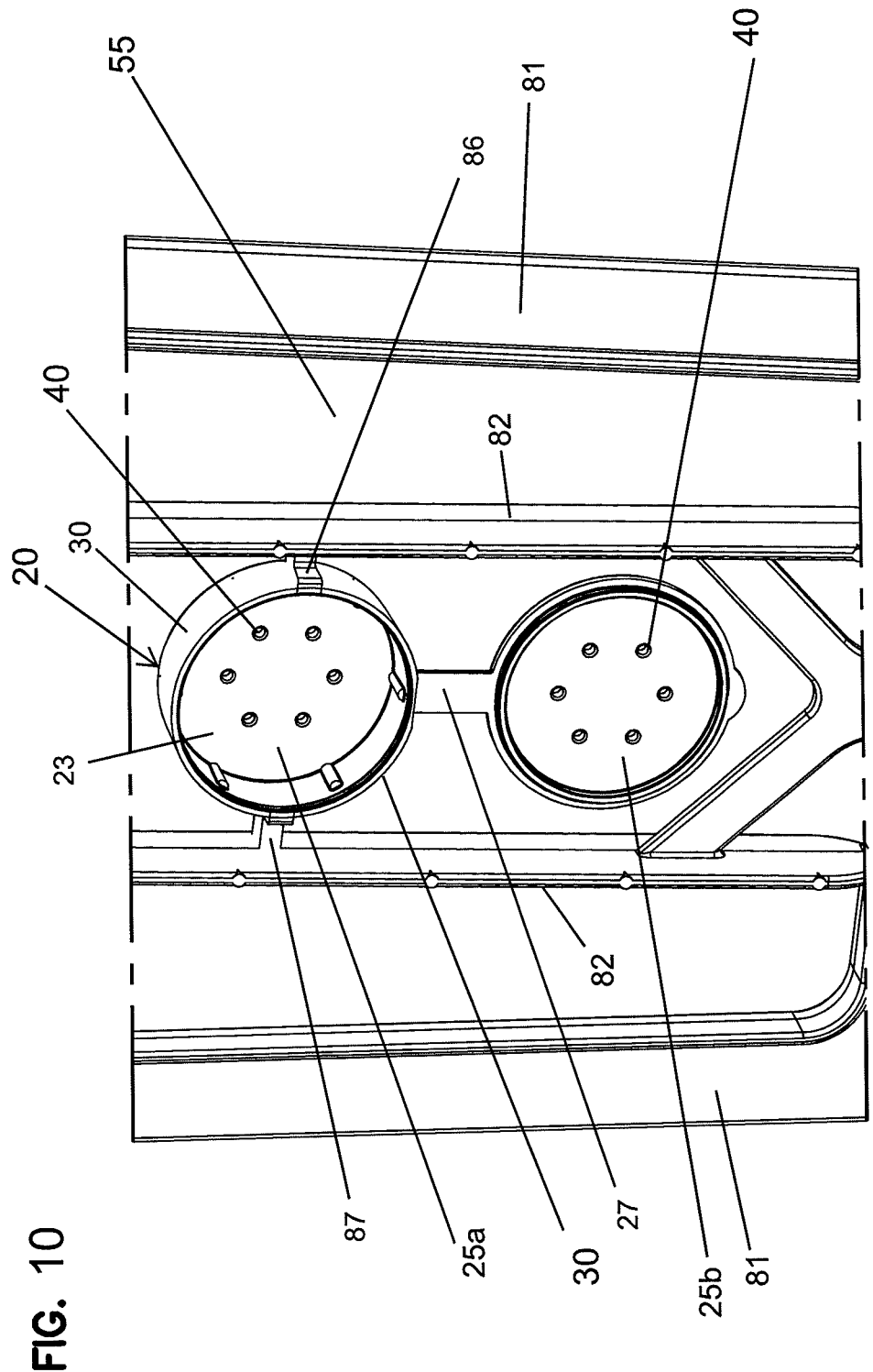
FIG. 10 is an enlarged, perspective view of a portion of the frame and tablet holder of FIG. 8.

As mentioned previously, the tablet holder 50, in the embodiment of FIGS. 8-10, is attached or secured to the frame 55. Many embodiments are possible. In the example embodiment depicted, the tablet holder 50 is non-removably secured to the frame 55 with ribs 86, 87. As can be seen in FIGS. 8-10, rib 86 connects a first of the separators 82 to edge 30, and rib 87 connects a second of the separators 82 to edge 30.

Semi-porous barrier 60, as shown, is made of non-woven air laid fibers. The semi-porous barrier 60 should be made of a material that is capable of straining particles out the water flowing through the filter cartridge 50. Additionally, carbon particles 70 may be removed from the foil pouch 75 and placed within the internal cavity of semi-porous barrier 60. The activated carbon granules will chemically adsorb odors and tannins molecules from the water.

Semi-porous barrier 60 (FIGS. 2-7) comprises a first or front filter wall 92 for filtering water flowing into filter cartridge 50 and second or back filter wall 93 for filtering water flowing out from filter cartridge 50. The density and/or surface area difference between the first and second filter walls leads to advantages in embodiments that use this feature. The first filter wall 92 comprises a porous filter material having a density and/or surface area similar to the filter materials used in the BIO-BAG® (United Pet Group, a Spectrum Brands Company-Blacksburg, Va.) and commercially available. The second filter wall 93, however, comprises either the same or different type porous filter as the first filter wall 92 provided the density and/or surface area of the second filter wall 93 is greater than that of the first filter wall 92. Without being bound by any particular theory, increasing the density or surface area of the filter wall 93 increases the capability of retaining finer waste/particulates trapped by the filter wall 93. Increasing filter wall density in this manner, however, also accelerates the clogging. Thus, by combining a first filter wall 92 or panel of traditional density for filtering incoming aquarium water with a second filter wall 93 of higher density (or surface area) for the outlet flow filtration effectiveness is increased, without accelerating the clogging rate of the filter cartridge 50.

In one embodiment, the first and second filter walls 92, 93 are joined together using conventional binding technologies, such as heat sealing, mechanical binders, chemical adhesives, etc.) along three of the four perimeter edges of each filter wall to form the semi-porous barrier 60 structure. It will be readily apparent that the first and second filter walls 92, 93 may be joined along the periphery by any number of various means provided an opening large enough is available to permit insertion of frame 55. Additionally, should optional filter material 70 be present, the peripheral edges of the filter walls 92, 93 should be so sealed as to prevent loss or leakage of the filter material.

In reference now to FIG. 4, an additional treatment material such as activated carbon or charcoal 70 may be added to the internal cavity of semi-porous barrier 60, and the flaps 80 are folded down, sealing the upper edges of the semi-porous barrier 60 between the flaps 80 and top portion 78 to prevent activated carbon or charcoal from spilling out. When the assembled filter cartridge 50 is inserted into a receiving slot of filter assembly 85 (FIG. 7), the flaps 80 will normally be held down. However, optionally, in order to assure that the flaps 80 hold the semi-porous barrier 60 tightly, the clip 65 can be used. The clip 65 is also useful in preventing the escape of filtering material held in the semi-porous barrier 60 when shipping the cartridge pre-assembled. The clip 65 is U-shaped and is snapped over the flaps 80 once they have been folded down. The clip 65 biases the flaps toward one another thus holding the semi-porous barrier 60 closed and sealed. It should be understood that other suitable biasing means may also be used, such as integrating the molding of the flaps 80 and the frame 55 so the flaps 80 are resiliently biased.

Method of Making

Initially, the active ingredient(s), binder, pH buffer and other optional components are combined in a dry powder or particulate form. The complete dry mixture is placed in a conventional tableting machine. It should be appreciated that the slurry is a homogenous mixture with the active ingredient uniformly dispersed throughout. To state another way, the mixture is substantially uniform in that each tablet will comprise the same, or substantially the same, amount of all ingredients including the active ingredient. The dry active ingredient, pH buffer and binder, upon mixing are then compressed in a conventional tableting machine. The compression is about 10,000 to 15,000 psi. The complete mixture is used to make a batch of tablets that range from 2.5 grams to 5 gram/tablets.

Once subjected to the compression step a tableted product is obtained which has the desired hardness, and a predetermined prolonged action. The compressed mixture is substantially uniform throughout the tablet. This uniformity provides predetermined delivery of active ingredient over the course of the tablet lifespan and for consistency of performance from tablet to tablet. The hardness and formulation of the tablet provide a regular delayed release pattern so that the active ingredient is available over a period of time in high flow water systems. In one example embodiment the time-release of active ingredient is available for 1 to 30 days. In some related embodiments the time-release of active ingredient is available for 1 to 60 days. The specific duration of available active ingredient is dependent on tablet size, hardness and the particular formulation. In this way, it is possible to produce sustained or slow continuous release tablets in relatively simple and economical manner on a commercial scale.

In alternative embodiments, the chemical formulation is made into a block. Initially, the active ingredient(s), binder, pH buffer and other optional components are combined to form a substantially uniform slurry. Subsequently, the mixture is then poured in molds, and the wet mixture is allowed to dry. The mixture is then removed from the molds and packaged for use. Similar to the tablet composition, the mixture is uniform to provide consistent dose delivery of the active ingredient(s) from block to block.

Method of Use

Referring to FIGS. 1-12, tablet holder 10 should be sized and configured such that it can retain a tablet or block. Once the tablet or block is placed within the tablet holder 10, the tablet holder is placed within a water container (i.e. aquarium), along with filter cartridge 50. The tablet, being placed within the internal cavity 23 of tablet holder 10 is exposed to the water flowing through filter assembly. Thus, the tablet is in fluid communication with the water flowing within the water container, such as an aquarium.

Figure 7:
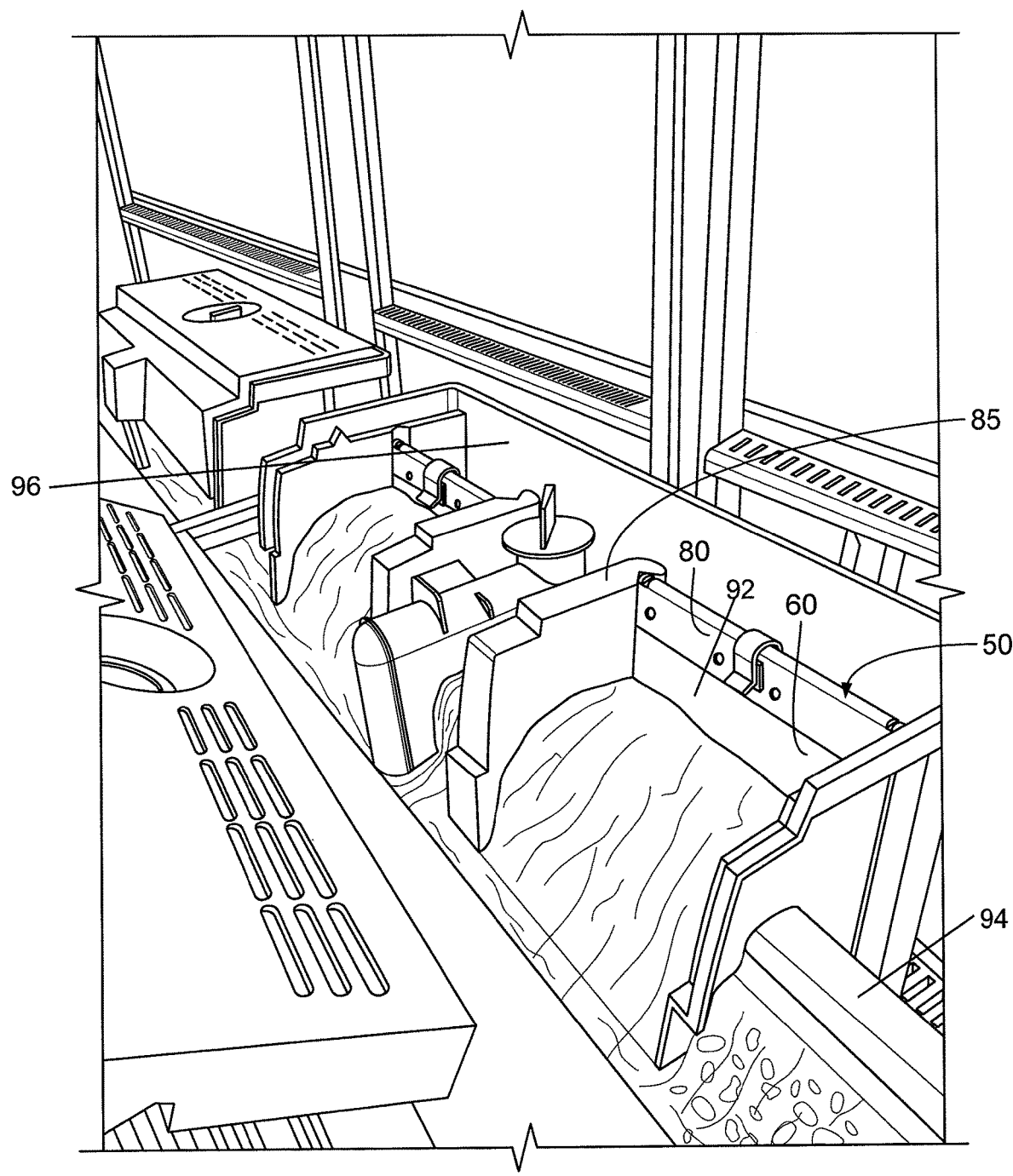
FIG. 7 is perspective view depicting the assembled filter cartridge from the kit of FIG. 2 and disposed within a filter assembly in use in an aquarium.

Referring now to FIGS. 2-3 where a kit including a tablet 5, tablet holder 10, semi-porous barrier 60, filter cartridge 55 and pouch 75 containing filtration material, such as activated carbon (not shown). The filter cartridge 50 and tablet holder 10 are used in connection with an external filter assembly as shown in FIG. 7. The illustration depicts a filter assembly 85 disposed on one side of the aquarium tank 94 and adapted to receive the filter cartridge 50. The filter cartridge 50 is slideably received in two opposing grooves forming the filter cartridge receiving slot of filter assembly 85. Water from the aquarium is pulled into the filter system through a pump assembly. The aquarium water is pumped into an intake chamber 96. From the intake chamber 96, the water flows into the mechanical filtering chamber 85.

The frame 55 is positioned within the semi-porous barrier 60. The separators 82 hold the opposing front and back walls 92, 93 of the semi-porous barrier 60 in spaced relation. As the water is forced through the filter cartridge 50, it passes first through the first filter wall 92 or panel, which initially filters the water. It then passes through and is, optionally, treated by the carbon or charcoal 70 or other filtration material placed in the semi-porous barrier 60. The water then flows through the second filter wall 93 or panel of higher density or surface area than the first filter wall 92. This allows for additional filtering of particulate wastes and, additionally, restricts the passage of charcoal particles to the aquarium. The multiple step filtering allows for improved filtration of water.

In one example embodiment, the tablet holder 10 will protect the tablet 5 or block from abrasion from debris within the container. It should be appreciated that the active ingredient interacts with the water by being in fluid communication with the exterior surface of the tablet or block. In high flow environments, the tablet 5 or block will be exposed to water flow when the tablet holder 10 is properly installed with the filter cartridge 50, allowing a predetermined dose of active ingredient to be dispensed over time. This time-release provides a substantially uniform treatment regime from tablet to tablet.

Referring now to FIGS. 3-7, frame 55 is inserted into the semi-porous barrier 60. As best shown in FIG. 4, the carbon particles 70 are poured into the semi-porous barrier 60, and the tablet 5 or block is placed in the tablet holder 10 (FIGS. 8-10), which is also placed within the semi-porous barrier 60 (not shown). In FIG. 4, the frame 55 includes top flaps 80 that can be folded down to trap the semi-porous barrier 60 closed. In at least this embodiment, the frame clip 65 is applied to the frame 55 to keep the opening of semi-porous barrier 60 closed (see FIG. 5) when in use. In other example embodiments, the tablet 5 or block is placed within the semi-porous barrier 60 without a tablet holder 10. In at least this example embodiment, the semi-porous barrier 60 acts in a similar capacity to the tablet holder 10 in that it will reduce water flow around the external surface of the tablet 5 or block.

Referring now to FIG. 7, filter cartridge 50 is installed into filter assembly 85 that directs water flow through the filter cartridge 50 so that it flows over the activated carbon and the tablet holder 10 so that the active ingredients leaches to the water. Treatment level or quality of the water treated by the tablet holder 10 is controlled by providing conditions such that the interaction between the water and the tablet 5 proceeds through the continuous movement of water passing through tablet holder 10 and interacting with tablet 5. As shown in the embodiment of FIGS. 8-10, when the tablet holder 10 is integrally connected to frame 55, the semi-porous barrier 60 and the tablet holder 10 will both prevent debris and excess water flow from the external surface of the tablet 5 or block.

As described in Tables 1-5 below, experiments were conducted using a 5 gram tablet in 6-hole tablet holder to determine rate of active release across a range of filter unit types and tank sizes. The experiments were set up using municipal tap water (Blacksburg, Va.), heaters were added and turned on and filters without filter cartridges were placed on the tanks. Aquaria were permitted to equilibrate overnight. Baseline pH, temperature, alkalinity and EBC-1® (polyquat, Buckman Laboratories, Memphis Tenn.) concentrations were determined. Each tank was then fitted with a filter cartridge, including a tablet holder and 5 gram tablet. All measurements were again taken on each tank for the next four days and again three days later.

Figure 13:
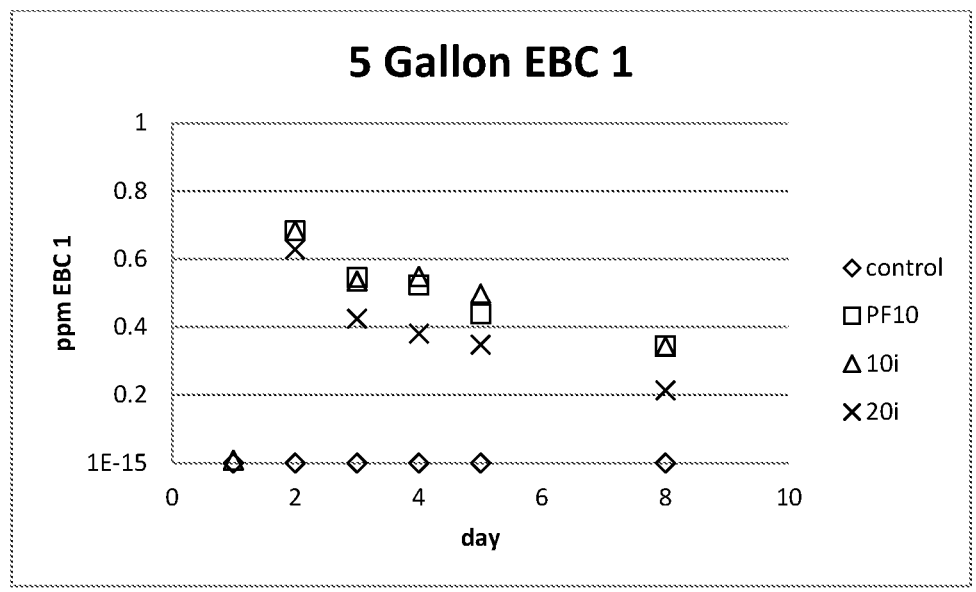
FIG. 13 shows Table 1, which describes EBC-1 concentration over time in 5-gallon tanks 3 different filter systems.

As shown in FIG. 13 (Table 1), rates of release of the active ingredient EBC-1® (polyquat, Buckman Laboratories, Memphis Tenn.) in a 5 gallon tank. The results compare control tanks with three groups of experimental tanks each equipped with different filtration systems. Experimental tanks included one filtration system for comparison of the parts-per-million (ppm) of active ingredient EBC-1® over an 8 day period. The filter systems included the external filtration system WHISPER® Aquarium and Fish Tank Power Filters (United Pet Group, a Spectrum Brands Company, Blacksburg, Va., commercially available and suggested for 5-10 gallon tanks)(PF10); WHISPER®, Internal Aquarium Power Filter system (United Pet Group, a Spectrum Brands Company, Blacksburg, Va.), commercially available and suggested up to 10 gallon tanks (10i); and WHISPER®, Internal Aquarium Power Filter system (United Pet Group, a Spectrum Brands Company, Blacksburg, Va.), commercially available and suggested for up to 20 gallon tanks (20i).

Figure 14:
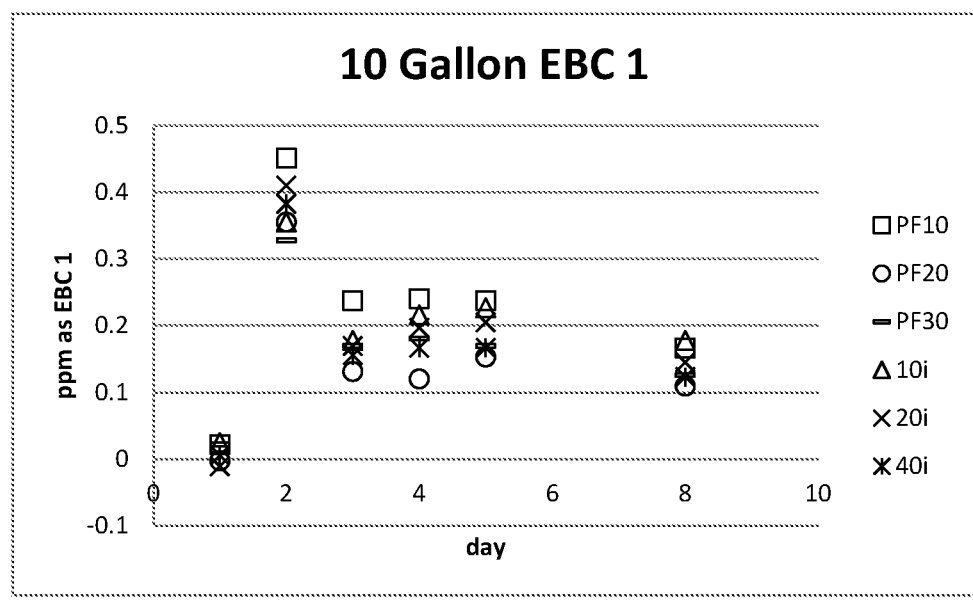
FIG. 14 shows Table 2, which describes EBC-1 concentration over time in 10-gallon tanks with six different filter systems.

Referring now to FIG. 14 (Table 2), As shown, the relationship between filter flow rate and active concentration using a tablet with active ingredient EBC-1. Table 2 describes similar results shown were across the various experimental filter systems in 10-gallon tanks. Experimental tanks included one filtration system for comparison of the parts-per-million (ppm) of active ingredient EBC-1® over an 8 day period. In addition the above referenced filter systems: PF10, 10i and 20i, experiments also included the external filtration system WHISPER® Aquarium and Fish Tank Power Filters (United Pet Group, a Spectrum Brands Company, Blacksburg, Va., commercially available and suggested for up to 20 gallon tanks)(PF20); WHISPER® Aquarium and Fish Tank Power Filters (United Pet Group, a Spectrum Brands Company, Blacksburg, Va., commercially available and suggested for up to 30 gallon tanks) (PF30); WHISPER®, Internal Aquarium Power Filter system (United Pet Group, a Spectrum Brands Company, Blacksburg, Va.), commercially available and suggested up to 40 gallon tanks (40i).

Figure 15:
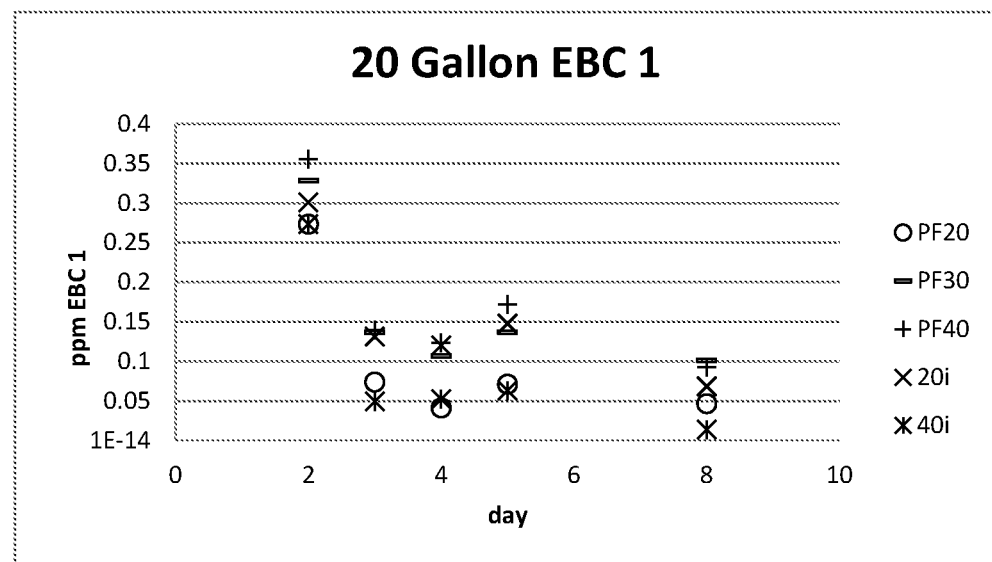
FIG. 15 shows Table 3, which describes EBC-1 concentration over time in 20-gallon tanks with five different filter systems.

FIG. 15 (Table 3) describes experiments performed in 20-gallon tanks. As shown, the relationship between filter flow rate and active concentration using a tablet with active ingredient EBC-1. Experimental tanks included one filtration system per tank for comparison of the parts-per-million (ppm) of active ingredient EBC-1® over an 8 day period. In addition the above referenced filter systems: PF20, PF30, 20i and 40i, experiments also included the external filtration system WHISPER® Aquarium and Fish Tank Power Filters (United Pet Group, a Spectrum Brands Company, Blacksburg, Va., commercially available and suggested for up to 40 gallon tanks)(PF40). As shown in the graph, the Power Filter systems resulted in the highest concentration of active found in the tank, when compared to the flow rate. For example, the Power Filter system with the highest flow rate, PF40, had the highest concentration, while the lowest flow Power Filter system, PF20, produced the lowest active concentration among the high-flow filters. However, with the internal high flow filters the opposite pattern was seen.

Figure 16:
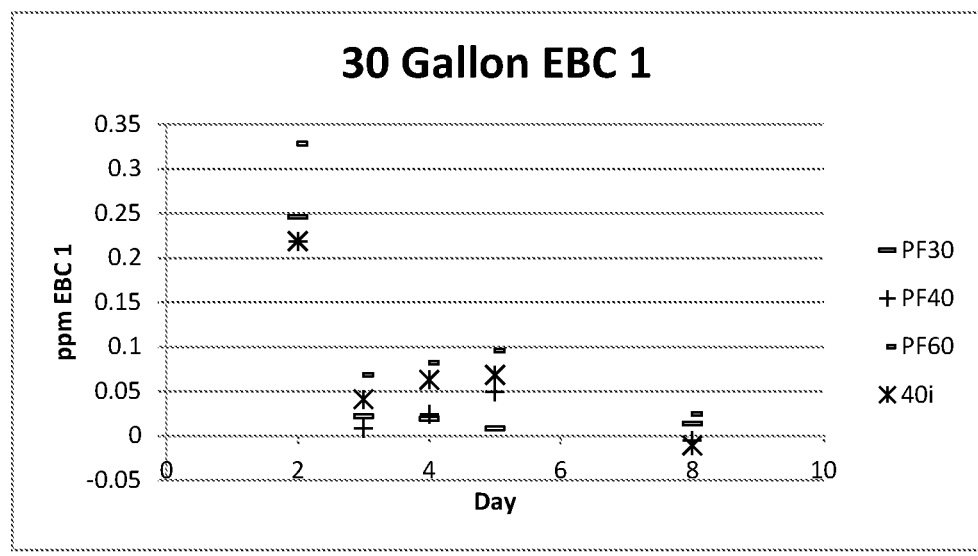
FIG. 16 shows Table 4, which describes EBC-1 concentration over time in 30-gallon tanks with four different filter systems.
Figure 17:
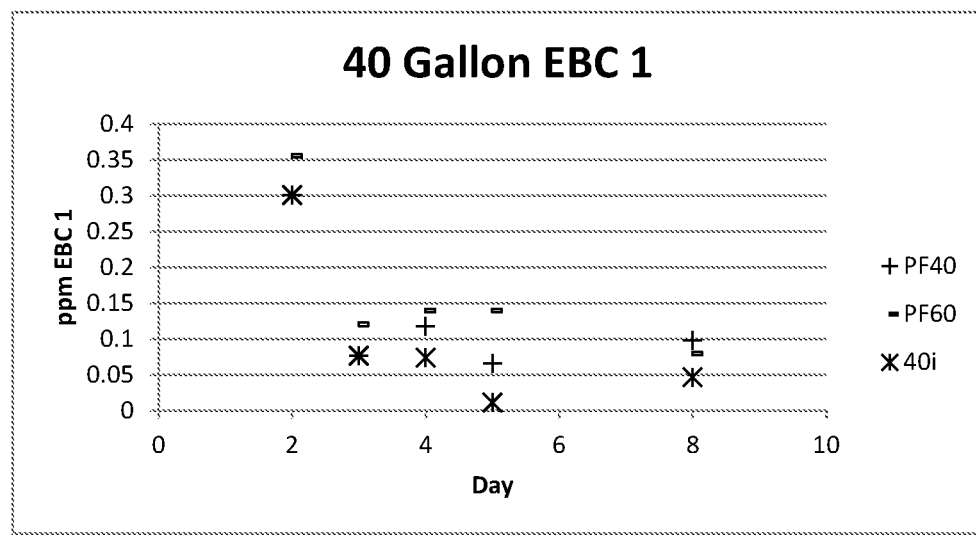
FIG. 17 shows Table 5, which describes EBC-1 concentration over time in 40-gallon tanks with three different filter systems.

FIGS. 16 (Table 4) and 17 (Table 5) describe experiments performed in 30-gallon and 40-gallon tanks respectively. The relationship between filter flow rate and active concentration using a tablet with active ingredient EBC-1 is shown. Experimental tanks included one filtration system per tank for comparison of the parts-per-million (ppm) of active ingredient EBC-1® over an 8 day period. In addition the above referenced filter systems: PF30 (not used in Table 4), PF40, and 40i, experiments also included the external filtration system WHISPER® Aquarium and Fish Tank Power Filters (United Pet Group, a Spectrum Brands Company, Blacksburg, Va., commercially available and suggested for up to 60 gallon tanks)(PF60). In the 30-gallon and 40-gallon tanks, the relationship between filter flow rate and active concentration remained within optimal concentrations for aquarium environments. Although the PF60, which includes two filter cartridges and two tablets, it did not release double the concentration of the single cartridge filters in the first 24 hours. However, it did maintain a roughly doubled dose over the next three days.

It should be appreciated that once a period of time expires, the amount of active ingredients in the water will be reduced or depleted, thus the tablet holder 10 should be removed from the water container, and a new tablet 5 should be placed within the internal cavity 23 of tablet holder 10. The amount of water that flows through the tablet holder 10 is a function of the location of the tablet holder 10 with respect to the fluid flow within the water container. Tablet composition and flow rates through the tablet holder 10 will determine the amount of active ingredients released over time. The amount of active ingredients will also be affected by the diameter of the apertures 40 and the size of the tablet 5.

As previously mentioned the tablet 5 or block formation can be formulated and sized in a manner that will allow for an effective dose to be available within the container for the 30 day useful life of the tablet 5 or block. In other related embodiments, the tablet 5 or block will release an effective dose of active ingredient for at least 30 days. In other related embodiments, the tablet 5 or block will release and effective dose of active ingredient for at least 60 days. In other related embodiments, the tablet 5 or block will release and effective dose of active ingredient for between 1-30 days. In other related embodiments, the tablet 5 or block will release and effective dose of active ingredient for between 1-60 days. It should be appreciated that the tablet 5 is usually completely dissolved within about 1 week to 10 days. However, while the initial concentration of the dose of active ingredients is highest on the early portion of the treatment period, the active ingredient is still providing water treatment for at least 30 days.

Towards the end of the dosing period, it is necessary to allow the concentration of active ingredients in the tank to drop before the next tablet is added to prevent too high a concentration of active ingredients to the water throughout the treatment process. This is primarily due to the active ingredient being bound to internal aquarium surfaces. Thus, even though the entire tablet 5 is complete dissolved, the active ingredient will still provide an effective treatment to the tank water.

Although exemplary embodiments of principles of this disclosure have been described in detail above, those skilled in the art will readily appreciate that many modifications are possible without materially departing from the principles.

What is claimed is:

1. A tablet holder for dispensing a chemical formulation comprising:
a body portion, wherein the body portion comprises a first side, a second side, and an solid edge from between 90 degrees and 270 degrees along the first side and the second side, at least one of the first side or second side comprises a plurality of apertures, the plurality of apertures sized to control the rate of dispersal of the chemical formulation in a high flow environment and wherein the first side and second side are substantially similar in size and comprise a fixed distance between the first side and the second side in a use and non-use configuration,
wherein the first and second sides are connected via the edge, whereby forming an internal cavity, wherein the edge comprises an opening, wherein the opening of the edge is in communication with and permitting access to the internal cavity, and wherein the internal cavity is sized to allow for a metered dose of the chemical formulation to be placed therein.

2. The tablet holder claim 1, wherein the first side and second side each comprise at least 6 apertures.

3. The tablet holder of claim 1, wherein each aperture is sized between 0.25 mm to 1.75 mm.

4. The tablet holder of claim 1, wherein at least one of the first side or second side comprises at most 50 apertures.

\* \* \* \* \*